June 4, 1940.    B. DICK    2,202,842
BRAKE SHOE MOUNTING
Filed Jan. 5, 1939    3 Sheets-Sheet 1
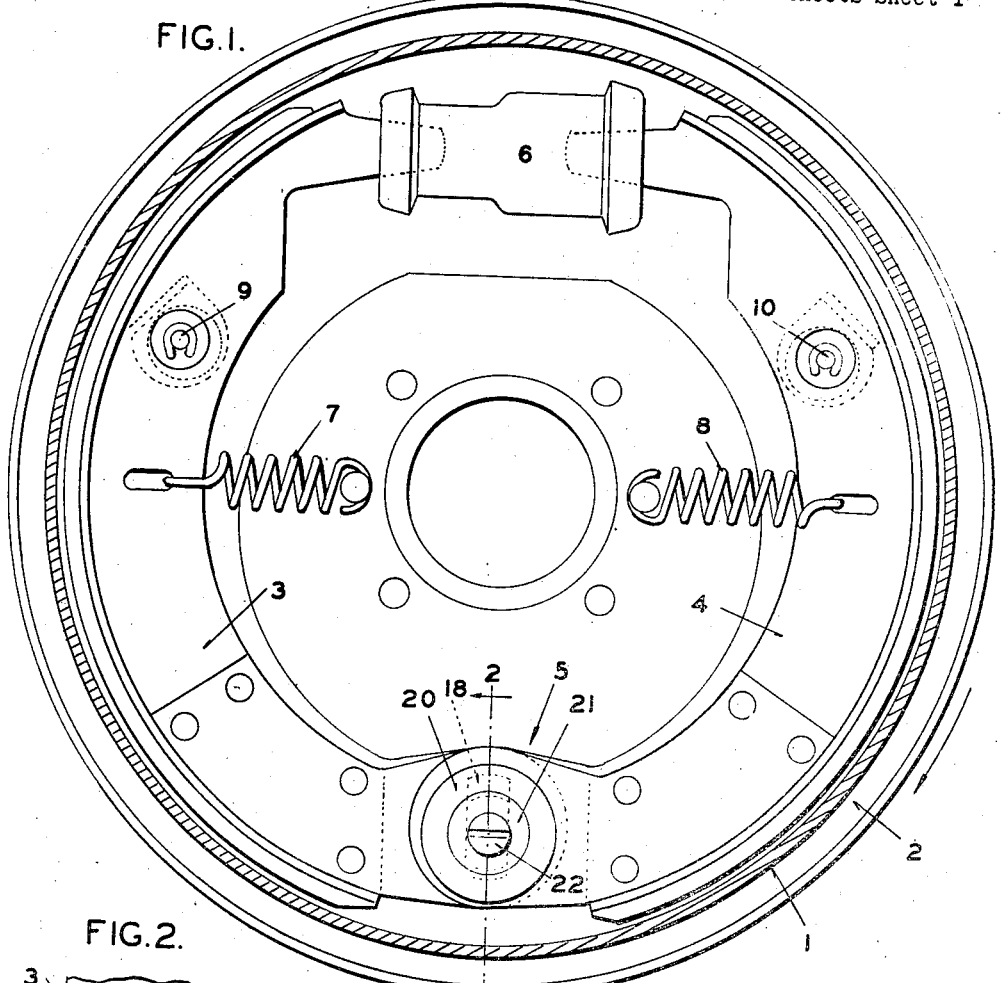
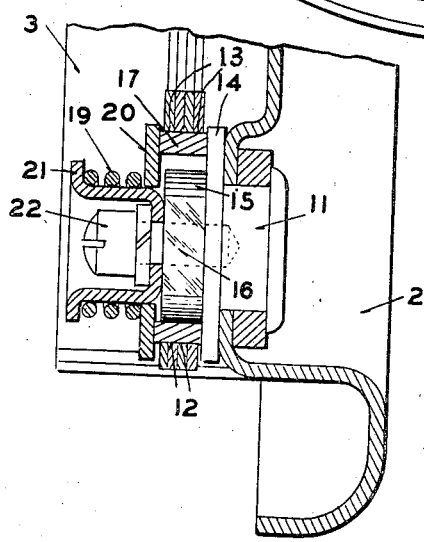
INVENTOR
BURNS DICK
ATTORNEY June 4, 1940.                B. DICK                 2,202,842
                        BRAKE SHOE MOUNTING
                        Filed Jan. 5, 1939              3 Sheets-Sheet 2
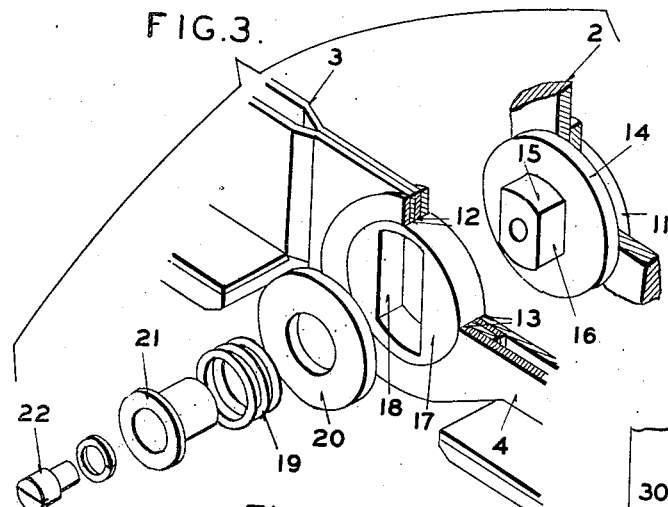
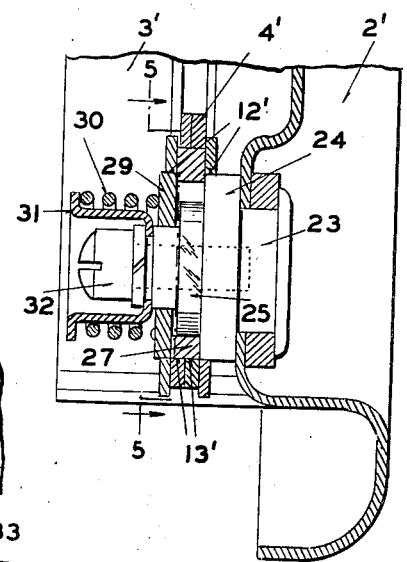
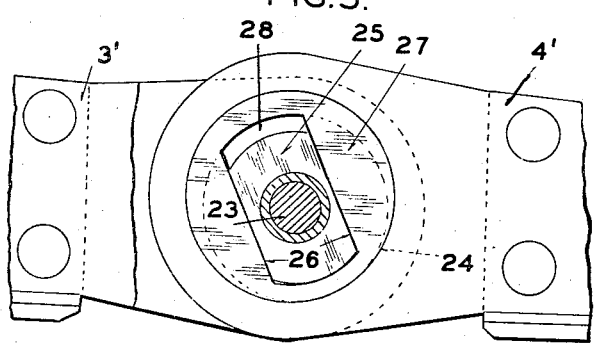
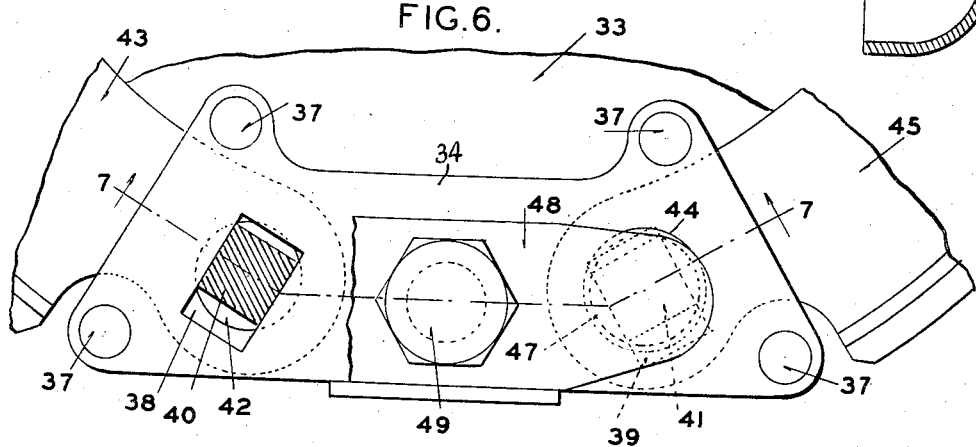
INVENTOR
BURNS DICK
BY
ATTORNEY June 4, 1940.  B. DICK  2,202,842
BRAKE SHOE MOUNTING
Filed Jan. 5, 1939   3 Sheets-Sheet 3
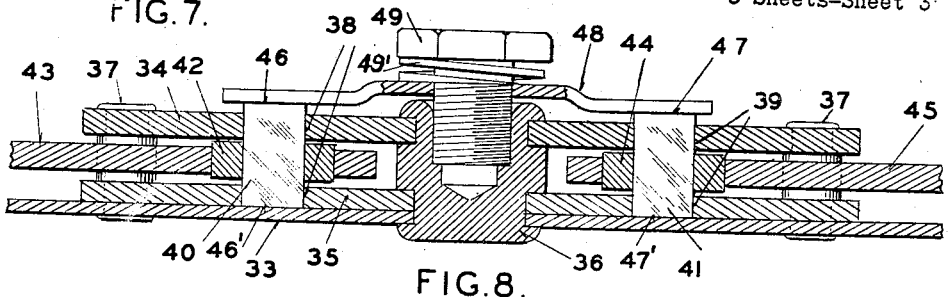
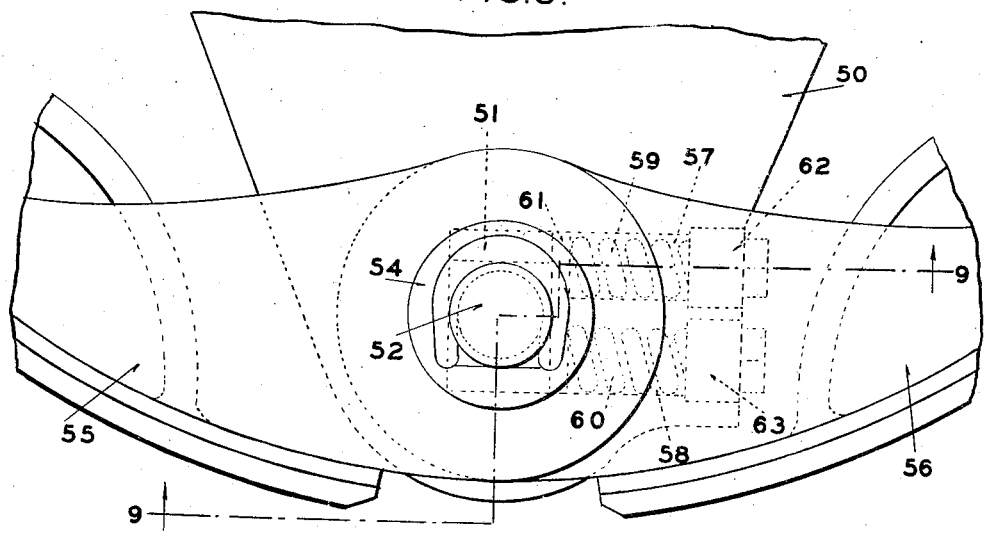
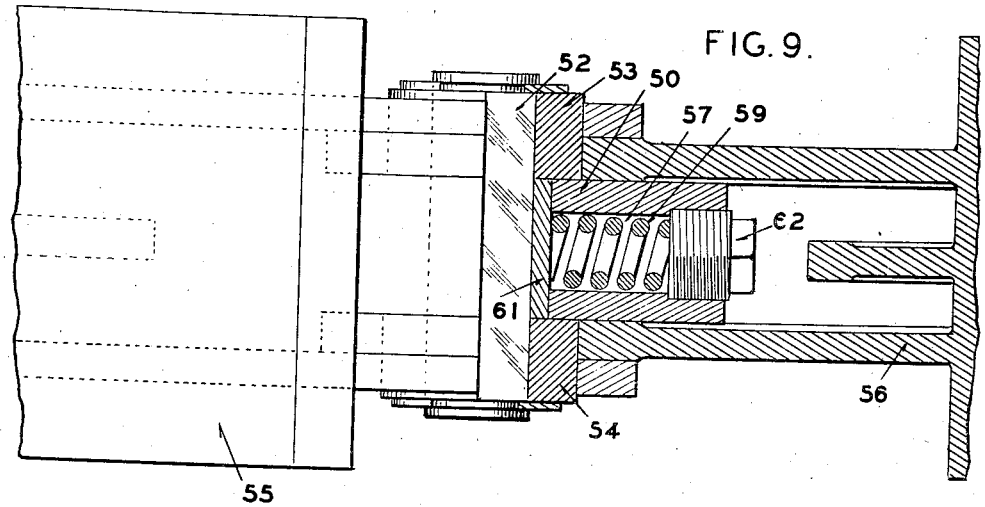
INVENTOR
BURNS DICK
BY
ATTORNEY Patented June 4, 1940

2,202,842

UNITED STATES PATENT OFFICE 2,202,842

BRAKE SHOE MOUNTING

Burns Dick, Ferguson, Mo., assignor to Wagner Electric Corporation, St. Louis, Mo., a corporation of Delaware Application January 5, 1939, Serial No. 249,356

19 Claims. (Cl. 188—79.5)

My invention relates to a brake shoe mounting, one of its objects being to provide a construction in which the operation of frictional means for automatic adjustment of the pivoted end of the shoe toward the drum as the lining wears is not affected by the rotation of the shoe on its pivot in application and release of the brakes.

Other objects of my invention will become apparent from the following description taken in connection with the accompanying drawings in which Figure 1 is a view of a brake provided with improved mounting means for the shoes which embodies my invention; Figure 2 is a cross-sectional view taken on the line 2—2 of Figure 1; Figure 3 is an exploded view showing details of the mounting for the shoes; Figure 4 is a cross-sectional view showing a mounting similar to that of Figure 1 but having only one shoe which is permitted to be automatically adjusted toward the drum; Figure 5 is a side view of the mounting shown in Figure 4, said view taken on the line 5—5 of Figure 4; Figure 6 is a view of a modified construction showing my invention embodied in a brake having separate anchors for the shoes; Figure 7 is a cross-sectional view taken on the line 7—7 of Figure 6; Figure 8 is a view of still a further modification showing a brake similar to that of Figure 1 but having a differently constructed single mounting for the shoes; and Figure 9 is a cross-sectional view taken on the line 9—9 of Figure 8.

I have disclosed my invention as being embodied in different brake assemblies. Some of these brake assemblies, however, also embody other novel combinations of elements producing new braking characteristics which form the subject-matter of a separate application.

Referring to Figures 1, 2 and 3, numeral 1 indicates the usual brake drum secured to a rotating member such as a vehicle wheel and 2, the support or backing plate secured to a fixed member. Within the drum are two shoes 3 and 4 having their lower ends pivotally mounted on the backing plate by my improved mounting means generally indicated by the numeral 5. The upper adjacent ends of the shoes are shown as being actuatable into engagement with the drum by the fluid motor 6 connected to a suitable source of pressure (not shown). Springs 7 and 8 normally hold shoes 3 and 4 disengaged from the drum and against the "off" position stops 9 and 10.

My improved mounting means 5 comprises a pin 11 secured to the backing plate 2 and extending through an opening 12 in the lower end of shoe 3 and an opening 13 in the lower bifurcated end of shoe 4 which receives the end of shoe 3. The pin 11 has an annular shoulder 14 for engagement with the backing plate and also a portion 15 having opposed flat surfaces 16 lying in planes parallel to a radius of the brake passing through the center of the pin. A bearing member 17 formed with a slot 18 is mounted on portion 15 and serves as the pivot bearing for the ends of shoes 3 and 4 which are positioned thereon by the openings 12 and 13. The sides of slot 18 cooperate with the flat surfaces 16 and the length of the slot is greater than the length of portion 15 in order that the bearing member and the shoes can move in a radial direction. The bearing member 17 is also of a thickness greater than the combined thickness of the ends of the two shoes. The bearing member is frictionally held against the annular shoulder 14 by means of a spring 19 interposed between a washer 20 engaging the bearing member and a member 21 secured to the inner end of pin 11 by a screw 22. The pressure exerted by the spring is such as to maintain the bearing member in any position it may assume but not of sufficient pressure to prevent the member and the shoe ends to be moved toward the drum during braking action and as a result of a force produced by the frictional drag on the brake shoe.

In operation, when the drum is rotating in its normal forward direction, as indicated by the arrow, and it is desired to apply the brake, the fluid motor is actuated, thereby causing the shoes to move into engagement with the drum by a rotation around pin 11. Being independent of the friction means, the shoes are freely rotatable on the bearing member 17.

When the shoes are engaged with the drum, the braking torque will be taken by pin 11. The drag of the drum on the forward shoe 4 will produce a force causing the pivoted end of the shoe to be moved into tight engagement with the drum. This outward radial movement of the shoe is permitted by the shoe mounting means as the bearing member is only frictionally held in position and slot 18 is of sufficient length to permit the movement. Since the bearing member pivotally connects both shoes together, any movement of the end of shoe 4 toward the drum will also cause a corresponding movement of the end of shoe 3. It is thus seen that the ends of both shoes will be forced into tight engagement with the drum, thereby producing a considerably greater braking action than would be the case where the shoe ends were pivotally mounted on the backing plate and not permitted to have any radial movement toward the drum.

When the shoes are released from the drum, the bearing member 17 will maintain its position due to the frictional grip caused by spring 19. The shoes are retracted from the drum by a pivotal movement on the bearing member under the action of springs 7 and 8.

As the linings on the brake shoes wear, the pivoted ends of the shoes will be automatically adjusted toward the drum under the action of the force tending to move the end of shoe 4 toward the drum when this shoe is applied to the drum. The adjustment will always be maintained by the frictional grip on the bearing member caused by spring 19. Since the friction means does not contact with the brake shoes, the frequent pivotal movement of the shoes in service does not result in any wear of a friction surface and consequently the adjusted degree of frictional resistance to movement of the bearing member will remain substantially constant.

When the drum is rotating in the direction opposite that indicated by the arrow, shoe 3 will become the "forward" shoe and produce the force acting to move the pivoted ends of the shoes toward the drum. Otherwise the operation of the brake is the same as already described.

Referring to Figures 4 and 5, the brake shoe mounting shown permits only the mounted end of the forward shoe to have movement toward the drum, the end of the other shoe having a fixed pivot. Shoe 3' is formed with a bifurcated end which receives the end of shoe 4', said ends being provided with openings 12' and 13', respectively. The backing plate 2' carries an anchor pin 23 having an annular bearing portion 24 and a portion 25 provided with opposed flat surfaces 26. Mounted on this latter portion is a separate bearing member 27 having a slot 28 of greater length than that of the portion 25 in order to permit movement of the bearing member 27 toward the drum. The inner end of the pin carries a second separate bearing member 29 which is not capable of any relative movement with respect to pin 23. The bearing portion 24 and the bearing member 29 are of the same diameter and constitute the pivot bearing for the bifurcated end of shoe 3' and the bearing member 27 constitutes the pivot bearing for the end of shoe 4' when the shoes are assembled. The flat surfaces 26 of the pin are preferably at an angle to a radial line of the brake passing through the center of the pin. The thickness of the bearing member 27 is also slightly greater than the thickness of the portion 25 of the pin, thus permitting the bearing member to be frictionally gripped between the bearing member 29 and the bearing portion 24 under the action of a spring 30 interposed between the bearing member 29 and a member 31 secured to the inner end of the pin by a bolt 32.

In operation, when the brake shoes are applied to the drum, the mounted end of shoe 4' will be capable of being forced into engagement with the drum as a result of the braking drag on the shoe as slot 28 in the bearing member 27 permits such movement. The end of shoe 3' will not be affected by any movement of the end of shoe 4' since the bearings for shoe 3' cannot have any lateral movement relative to pin 23. Both shoes are always capable of being freely pivoted on their respective bearings since the construction is such that the friction means for the bearing member 27 acts only to frictionally hold this bearing in adjusted position. As the lining of shoe 4' wears, the end of this shoe will be automatically adjusted toward the drum and this adjustment will be maintained under the action of the friction created by spring 30.

In Figures 6 and 7 I have disclosed a modified construction which permits the lower ends of the two brake shoes to be mounted upon separate anchor pins. The backing plate 33 has secured thereto spaced plates 34 and 35 by means of a central attaching member 36 and a plurality of rivets 37. On opposite sides of the attaching member, the plates are provided with coinciding slots 38 and 39 which are adapted to receive, respectively, square pins 40 and 41. The pin 40 carries a bearing member 42 interposed between the two plates and mounted upon this member is the lower end of shoe 43. Similarly, pin 41 carries a bearing member 44 interposed between the plates and mounted upon this member is the lower end of shoe 45. The pins 40 and 41 are provided with flat ends 46 and 46' and 47 and 47', respectively. The ends 46' and 47' engage the flat surface of the backing plate. Cooperating with the ends 46 and 47 is a leaf spring 48 which is attached at its center to the attaching member 36 of the plates by means of a stud bolt 49. This leaf spring applies pressure to the ends of the pins, thus producing frictional resistance to their movement. The amount of pressure exerted on the ends of the pins can be varied by means of the stud bolt 49 which has interposed between its head and the leaf spring a coil spring 49'.

The construction permits the ends of the shoes to be freely pivoted on the bearing members carried by the square pins. The leaf spring for maintaining the pins frictionally held in any adjusted position has no effect upon the free pivotal movement of the shoes, yet the friction is such as to maintain the pins in any position they may assume in their slots. Thus, as the friction lining of the shoes wears, the ends of the shoes will be automatically forced toward the drum by the drag of the drum on the shoes. Since the ends of the shoes are mounted upon separate pins, the adjustment of one shoe will have no effect upon the adjustment of the other shoe. The slots in which the pins operate are shown as being at a slight angle to a radial line passing through the center of the drum and the center of each pin but this angle may be varied as desired in order to secure the best braking characteristics for the brakes.

In Figures 8 and 9 another modification is disclosed which permits both shoes to be mounted upon a single anchor pin. This construction is well adapted for large size brakes, as for example, those employed for trucks and heavy vehicles. The support 50, which is secured to some fixed part of the vehicle at the center of the brake, extends to a point adjacent the drum and is provided with a radial slot 51. Positioned in this slot is the anchor pin 52 of square cross section. Carried by the pin on opposite sides of support 50 are bearing collars 53 and 54 upon which are pivotally mounted the bifurcated ends of shoes 55 and 56. The portion of support 50 at one side of pin 52 is formed with two holes 57 and 58 for receiving springs 59 and 60 which are adapted to bear at the inner ends against a plate 61 which engages the one side surface of pin 52. The springs are placed under tension by means of screw plugs 62 and 63 screwed into the outer ends of the two holes.

The operation of the brake is the same as that shown in Figure 1. The shoes 55 and 56 may freely pivot on the bearing collars 53 and 54. The position of pin 52 in the slot is maintained by the action of springs 59 and 60. The slot 51 permits the pin 52 and the ends of the shoes mounted thereon to automatically move toward the drum as the friction lining wears.

Being aware of the possibility of other modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In braking mechanism embodying a brake drum, a brake shoe and a brake shoe support, a brake shoe mounting comprising means constituting a pivot for the shoe and means constituting an abutment carried by the support at the shoe end for preventing circumferential movement of the shoe and permitting movement of the shoe toward the drum by force effective on the shoe during brake application when the brake lining thickness at the pivoted end of the shoe is reduced by wear, and friction means independent of the shoe and functioning to oppose movement of the pivoted end of the shoe away from the drum.

2. In braking mechanism embodying a brake drum, a brake shoe and a brake shoe support, brake shoe mounting means carried by the support at the end of the shoe for preventing circumferential movement of the shoe and comprising an element forming a pivot bearing for the shoe, said element being movable toward the drum by force effective on the shoe during brake application when the brake lining thickness at the pivoted end of the shoe is reduced by wear, and friction means independent of the shoe and functioning to oppose movement of the bearing element away from the drum.

3. In braking mechanism, a support, a brake drum, a friction element, means comprising abutment means for taking the torque of the shoe and a bearing member for pivotally mounting the friction element, means for mounting the bearing member on the support for movement toward the drum during brake application when the brake lining thickness at the pivoted end of the shoe is reduced by wear, and means associated with the bearing member for establishing a frictional resistance to its movement away from the drum.

4. In braking mechanism, a support, a brake drum, a brake shoe, a member upon which an end of the shoe is pivoted, means for mounting said member on the support at the end of the shoe for preventing circumferential movement of the shoe, said means embodying means permitting the member and shoe end to move toward the drum as the friction surface of the shoe wears, and friction means for maintaining said member in an adjusted position but not preventing its movement toward the drum by a force effective during braking action.

5. In braking mechanism, a support, a brake drum, a brake shoe, a bearing member for pivotally mounting one end of the brake shoe, a pin carried by the support at the shoe end for mounting the bearing on the support and for preventing circumferential movement of the shoe, means permitting the bearing member to move relatively to the pin and toward the drum during braking action and as a result of wear of the friction surface of the shoe, and means for establishing a frictional resistance against movement of the bearing member away from the drum to thereby maintain the adjustment.

6. In braking mechanism, a support, a brake drum, a brake shoe, a bearing member for pivotally mounting one end of the brake shoe, a pin for mounting the bearing on the support, means comprising a slot in the bearing member for permitting the shoe end to move relatively to the pin and toward the drum during braking action and as a result of wear of the shoe lining, and spring means acting on the bearing member for frictionally maintaining the bearing member in adjusted position on the pin.

7. In braking mechanism, a support, a brake drum, a brake shoe, a pin secured to the support, a bearing member provided with a slot for receiving the pin and being of such size as to permit the bearing member to move laterally relative to the pin and toward the drum, means for pivotally mounting the shoe end on the bearing member, and means comprising a spring carried by the pin for frictionally clamping the bearing member in an adjusted position on the pin.

8. In braking mechanism, a support, a brake drum, a friction element, means comprising a pin carried by the support at the end of the element for taking the braking torque of the element and for pivotally mounting the element on the support whereby it can be actuated into and out of engagement with the drum, means for permitting said pin to be automatically moved toward the drum by force effective on the friction element during braking action and as said friction element wears, and friction means for maintaining said pin in adjusted position.

9. In braking mechanism, a support, a brake drum, a brake shoe for cooperation with the drum and means for mounting said shoe on the support for pivotal movement and also for movement toward the drum, said means comprising a pivot pin carried by the support and cooperating with the shoe for permitting the shoe to be rotated relative thereto, means for permitting the pin to move relatively to the support and toward the drum, and friction means acting on the pin and functioning to oppose its movement away from the drum.

10. In braking mechanism, a support provided with a slot, a brake drum, an anchor pin, said pin being mounted in the slot and said slot being of such length and so positioned with respect to the drum that the pin can move toward the drum, a brake shoe pivotally mounted on the pin, and friction means associated with the pin for maintaining the pin and shoe in any adjusted position in the slot but permitting said shoe to be automatically adjusted toward the drum during braking action and in accordance with the wear of the shoe.

11. In braking mechanism, a support provided with a slot, a brake drum, a brake shoe provided with a bearing at one end, a pivot pin for the shoe bearing and about which the shoe is adapted to pivot, said pin being mounted in the slot and said slot being of such length and so positioned with respect to the drum that the pivot pin and the end of the shoe can move toward the drum, friction means associated with the pin for maintaining the pin in any adjusted position in the slot but permitting said shoe end to be automatically adjusted toward the drum during braking action and in accordance with the wear of the shoe, and means for adjusting the friction means.

12. In braking mechanism, a support provided with a slot, a brake drum, a brake shoe provided with a bearing at one end, a pivot pin for the shoe bearing and about which the shoe is adapted to pivot, said pin being mounted in the slot and said slot being of such length and so positioned with respect to the drum that the pivot pin and the end of the shoe can move toward the drum, means providing cooperating surfaces carried by the support and pin, and a resilient member for forcing said surfaces into tight frictional engagement, the frictional engagement of said surfaces being such as to maintain the pin in an adjusted position but permitting said shoe end and pin to be automatically moved toward the drum during braking action and in accordance with the wear of the shoe.

13. In braking apparatus, a support, a brake drum, a brake shoe adapted for cooperation with the drum, two spaced plates carried by the support and receiving the end of the shoe therebetween, an anchor pin carried by the plates for pivotally mounting the shoe end, said plates being provided with slots for receiving the anchor pin and said slots permitting the pin and shoe end to be moved toward the drum, means providing cooperating surfaces between each pin and the support, a leaf spring for forcing said cooperating surfaces into tight frictional engagement, and a manually operable member for varying the force applied by the spring.

14. In braking apparatus, a support provided with a slot, a brake drum, a brake shoe provided with a bifurcated end receiving the slotted portion of the support and having aligned bearing openings, a pivot pin positioned in the slot and the bearing openings, said slot being of such length and so positioned with respect to the drum that the pivot pin and the end of the shoe can move toward the drum, a member carried by the support for frictionally engaging an intermediate surface of the pin, and a resilient member carried by the support for applying pressure to the member to force it into tight frictional engagement with the cooperating pin surface, the frictional engagement of the member and pin being such as to maintain the pin and shoe end in an adjusted position but permitting said pin and shoe end to be automatically moved toward the drum during braking action and in accordance with the wear of the shoe.

15. In braking apparatus embodying a brake drum, a brake shoe and a support for the brake shoe, brake shoe mounting and adjusting means permitting pivotal movement of the shoe end and comprising abutment means carried by the support at the end of the shoe for preventing circumferential movement of the shoe and other means permitting the shoe end to move toward the drum by force effective on the shoe during braking application when the brake lining thickness at the end of the shoe is reduced by wear, and means for maintaining the shoe end in adjusted position, said last named means not restraining free pivotal movement of the shoe in applying and releasing it from the drum.

16. In braking apparatus embodying a brake drum, a brake shoe and a support for the brake shoe, brake shoe mounting and adjusting means permitting pivotal movement of the shoe end and comprising abutment means carried by the support at the end of the shoe for preventing circumferential movement of the shoe and other means permitting the shoe end to move toward the drum by force effective on the shoe during braking application when the brake lining thickness at the end of the shoe is reduced by wear, and friction means for maintaining the shoe end in adjusted position, said friction means not restraining free pivotal movement of the shoe in applying and releasing it from the drum.

17. In braking apparatus embodying a brake drum, a brake shoe and a support for the brake shoe, brake shoe mounting and adjusting means permitting pivotal movement of the shoe end and comprising means carried by the support at the end of the shoe for preventing circumferential movement of the shoe and other means including parts having abutting plane surfaces capable of relative sliding movement for permitting the shoe end to move toward the drum by force effective on the shoe during braking application when the brake lining thickness at the end of the shoe is reduced by wear, and friction means for maintaining the plane surfaces in adjusted position, said friction means not restraining free pivotal movement of the shoe in applying and releasing it from the drum.

18. In braking apparatus comprising a brake drum, a brake shoe and a support therefor, brake shoe mounting and adjusting means permitting pivotal movement of the heel end of the shoe and comprising means carried by the support at said end of the shoe for preventing circumferential movement of the shoe and other means including parts having abutting surfaces capable of relative sliding movement in a selected plane for permitting the shoe end to be adjusted toward the drum by force effective on the shoe during braking application when the brake lining thickness at the end of the shoe is reduced by wear, and means preventing the end of the shoe from returning to a position occupied prior to such adjustment.

19. In braking apparatus comprising a brake drum, a brake shoe and a support therefor, brake shoe mounting and adjusting means permitting pivotal movement of the heel end of the shoe and comprising means carried by the support at said end of the shoe for preventing circumferential movement of the shoe and other means including parts having abutting surfaces capable of relative sliding movement in a selected plane for permitting the shoe end to be adjusted toward the drum by force effective on the shoe during braking application when the brake lining thickness at the end of the shoe is reduced by wear, said selected plane being at such an angle that when continued it will pass to that side of the drum centre remote from the shoe, and means maintaining said abutting surfaces in said adjusted position until additional lining wear permits further movement of the shoe end toward the drum during brake application.

BURNS DICK.